(12) United States Patent
Kim et al.

(10) Patent No.: US 12,554,181 B2
(45) Date of Patent: Feb. 17, 2026

(54) LENS DRIVING APPARATUS AND CAMERA MODULE INCLUDING THE SAME

(71) Applicant: SAMSUNG ELECTRO-MECHANICS CO., LTD., Suwon-si (KR)

(72) Inventors: Ju Ho Kim, Suwon-si (KR); Sanghyun Ji, Suwon-si (KR); Dooseub Shin, Suwon-si (KR); Dohwan Kim, Suwon-si (KR); Donghoon Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 299 days.

(21) Appl. No.: 18/500,287

(22) Filed: Nov. 2, 2023

(65) Prior Publication Data
US 2024/0319569 A1    Sep. 26, 2024

(30) Foreign Application Priority Data

Mar. 22, 2023   (KR) .................. 10-2023-0037586
Jun. 19, 2023   (KR) .................. 10-2023-0078249

(51) Int. Cl.
*G03B 17/12* (2021.01)
*G02B 7/09* (2021.01)
*G03B 13/36* (2021.01)

(52) U.S. Cl.
CPC .............. *G03B 17/12* (2013.01); *G02B 7/09* (2013.01); *G03B 13/36* (2013.01); *G03B 2205/0069* (2013.01)

(58) Field of Classification Search
CPC .................................................. G03B 17/12
See application file for complete search history.

(56) References Cited

U.S. PATENT DOCUMENTS

2011/0019985 A1   1/2011   Chiu et al.
2020/0393638 A1*  12/2020  Chiu ............... G03B 17/02

FOREIGN PATENT DOCUMENTS

| CN | 110741316 A | 1/2020 |
| EP | 4 134 735 A1 | 2/2023 |
| JP | 2015-34910 A | 2/2015 |
| KR | 10-1119345 B1 | 3/2012 |
| KR | 10-1483783 B1 | 1/2015 |
| KR | 10-2021-0125767 A | 10/2021 |
| KR | 10-2022-0166130 A | 12/2022 |

OTHER PUBLICATIONS

Korean Office Action issued on Aug. 11, 2025, in corresponding Korean Patent Application No. 10-2023-0078249. (6pages in English, 5pages in Korean).

* cited by examiner

*Primary Examiner* — Edmond C Lau
(74) *Attorney, Agent, or Firm* — NSIP Law

(57) ABSTRACT

A lens driving apparatus includes a lens holder having a central opening in which a lens is accommodated, a carrier accommodating the lens holder, an auto focus (AF) driver including a piezoelectric actuator disposed in the carrier, a driving rod connected to the piezoelectric actuator, and a friction member disposed in the lens holder contacting the driving rod, a magnet disposed in any one of the lens holder and the carrier, a magnetic yoke disposed in an other one of the lens holder and the carrier to face the magnet, and an elasticity member disposed between the lens holder and the carrier.

21 Claims, 17 Drawing Sheets

LENS DRIVING APPARATUS AND CAMERA MODULE INCLUDING THE SAME

CROSS-REFERENCE TO RELATED APPLICATION

This application claims the benefit under 35 USC § 119(a) of Korean Patent Application No. 10-2023-0037586, filed on Mar. 22, 2023, in the Korean Intellectual Property Office, and Korean Patent Application No. 10-2023-0078249, filed on Jun. 19, 2023, in the Korean Intellectual Property Office, the entire disclosures of which are incorporated herein by reference for all purposes.

BACKGROUND

1. Field

The present disclosure relates to a lens driving apparatus and a camera module including the same.

2. Description of the Related Art

Due to the remarkable development of information and communication technology and semiconductor technology, the supply and use of electronic devices are rapidly increasing. Cameras are now adopted in portable electronic devices such as smartphones, tablet PCs, and laptop computers. These cameras in portable electronic devices are added with auto focus (AF) functions, image stabilizer (IS) functions, and zoom functions.

The image stabilization function may include both camera shake compensation and hand shake compensation, and may prevent the image of a subject being photographed from vibrating due to unintentional hand shaking or camera shaking by the photographer, whether in a moving or fixed state of the camera.

The auto focus function is a function that enables a clear image to be obtained from an imaging surface of an image sensor by moving a lens positioned in front of an image sensor along an optical axis direction, according to a distance from a subject.

With the continuous development of portable electronic devices, the weight and size of lenses used in cameras are increasing, requiring the development of lens drive technology that is both more effective in implementing image stabilization and auto focus function and more productive.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one or more general aspects, a lens driving apparatus includes a lens holder having a central opening in which a lens is accommodated, a carrier accommodating the lens holder, an auto focus (AF) driver including a piezoelectric actuator disposed in the carrier, a driving rod connected to the piezoelectric actuator, and a friction member disposed in the lens holder contacting the driving rod, a magnet disposed in any one of the lens holder and the carrier, a magnetic yoke disposed in an other one of the lens holder and the carrier to face the magnet, and an elasticity member disposed between the lens holder and the carrier.

The magnet may include two or more magnets with the driving rod disposed therebetween or thereamong.

The magnet may be disposed in the carrier.

The elasticity member may be disposed in the carrier to contact the driving rod.

The magnet may be disposed in the lens holder.

The magnet may be disposed on the friction member.

The magnet may include two or more magnets with the driving rod disposed therebetween or thereamong.

The friction member may have a first surface in contact with the driving rod and a second surface facing the first surface, and the elasticity member may be positioned between an outer surface of the lens holder and the second surface of the friction member.

The carrier may have a first inner surface and a second inner surface parallel to an optical axis direction and parallel to each other. The two or more magnets may be disposed, at least, one on each of the first inner surface and the second inner surface.

The friction member may have at least two portions in contact with the driving rod.

The driving rod may include a protruding portion at a free end, and the protruding portion may protrude more toward the friction member than other portions of the driving rod. The friction member may contact the protruding portion.

The lens driving apparatus may further include a rolling member positioned between the carrier and the lens holder.

Opposing surfaces of the carrier and the lens holder may further include guide grooves accommodating the rolling member in a direction parallel to an optical axis direction.

A stopper may be disposed at a top or bottom of the guide groove.

At least one rolling member may be positioned between the first inner surface of the carrier and the lens holder, and another of the at least one rolling member may be positioned between the second inner surface of the carrier and the lens holder.

In another general one or more aspects, a camera module includes a lens barrel including a lens; a lens holder having a central opening in which the lens barrel is accommodated; a carrier accommodating the lens holder; an auto focus (AF) driver, comprising a piezoelectric actuator disposed in the carrier, a driving rod connected to the piezoelectric actuator, and a friction member disposed in the lens holder to contact the driving rod; a magnet disposed in any one of the lens holder and the carrier;
   a magnetic yoke disposed in another one of the lens holder and the carrier to face the magnet; and an elasticity member positioned between the lens holder and the carrier.

The magnet may include two or more magnets with the driving rod disposed therebetween or thereamong.

The magnet may be disposed in the carrier.

The magnet may be disposed in the lens holder.

The elasticity member may be disposed on the carrier to contact the driving rod.

Other features and aspects will be apparent from the following detailed description, the drawings, and the claims.

Figure 1:
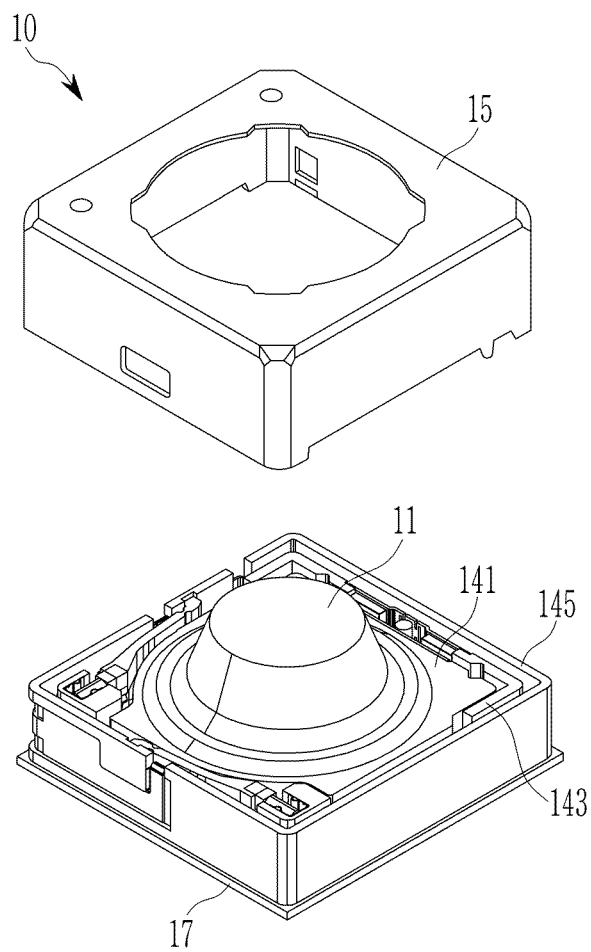
FIG. 1 is a perspective view illustrating an example of a camera module according to an embodiment.

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment, e.g., as to what an example or embodiment may include or implement, means that at least one example or embodiment exists where such a feature is included or implemented, while all examples are not limited thereto.

Throughout the specification, when a component or element is described as being "on", "connected to," "coupled to," or "joined to" another component, element, or layer it may be directly (e.g., in contact with the other component or element) "on", "connected to," "coupled to," or "joined to" the other component, element, or layer or there may reasonably be one or more other components, elements, layers intervening therebetween. When a component or element is described as being "directly on", "directly connected to," "directly coupled to," or "directly joined" to another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

Due to manufacturing techniques and/or tolerances, variations of the shapes shown in the drawings may occur. Thus, the examples described herein are not limited to the specific shapes shown in the drawings, but include changes in shape that occur during manufacturing.

Unless otherwise defined, all terms, including technical and scientific terms, used herein have the same meaning as commonly understood by one of ordinary skill in the art to which this disclosure pertains specifically in the context on an understanding of the disclosure of the present application. Terms, such as those defined in commonly used dictionaries, are to be interpreted as having a meaning that is consistent with their meaning in the context of the relevant art and specifically in the context of the disclosure of the present application, and are not to be interpreted in an idealized or overly formal sense unless expressly so defined herein.

Further, throughout the specification, the phrase "in a plan view" or "on a plane" means viewing a target portion from the top, and the phrase "in a cross-sectional view" or "on a cross-section" means viewing a cross-section formed by vertically cutting a target portion from the side.

Figure 2:
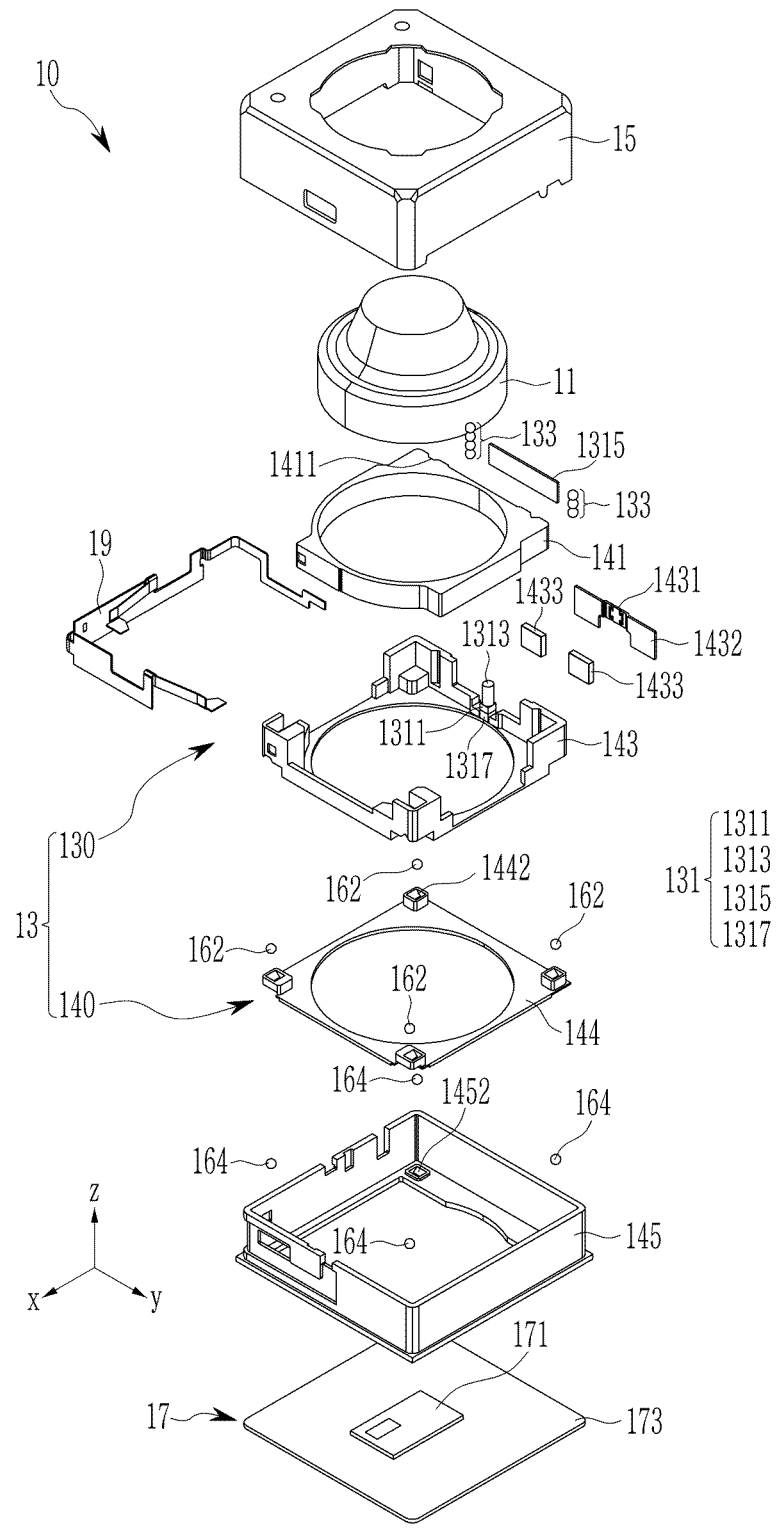
FIG. 2 is an exploded perspective view schematically illustrating the camera module shown in FIG. 1.

FIG. 1 is a perspective view illustrating an example of a camera module according to an embodiment, and FIG. 2 is an exploded perspective view schematically illustrating the camera module shown in FIG. 1.

Referring to FIGS. 1 and 2, a camera module 10 according to the embodiment includes a lens barrel 11, a lens driving device 13 for moving the lens barrel 11, an image sensor unit 17 converting light incident through the lens barrel 11 into an electrical signal, and a cover 15.

The lens barrel 11 may have a hollow cylinder shape so that a plurality of lenses for capturing a subject may be accommodated therein.

The plurality of lenses may be mounted on the lens barrel 11 along the optical axis. The plurality of lenses may be disposed as many as desired according to the design of the lens barrel 11. Each lens included in the plurality of lenses may have the same or different optical characteristics, such as refractive index.

The optical axis may be set to the central axis of the lens accommodated in the lens barrel 11, and the optical axis direction means a direction parallel to this central axis. In the drawing, the optical axis is set to the z-axis, and a first direction and a second direction are set in a direction vertical to the optical axis. At this time, the first direction and the second direction are vertical to each other. In this embodiment, for convenience of explanation, the first direction is defined as the x-axis direction of the drawing, and the second direction is defined as the y-axis direction of the drawing. The x-axis and the y-axis are vertical to each other, and the x-y plane formed by the x-axis and the y-axis becomes a plane vertical to the optical axis.

The lens barrel 11 may be accommodated in a lens holder 141, and a lens holder 141 may be accommodated in a carrier 143. The lens holder 141 has a central opening into which the lens barrel 11 may be inserted, and the lens barrel 11 is coupled to and fixed to the lens holder 141 through the central opening. The lens holder 141 and the carrier 143 may be accommodated in a housing 145 together. For example, the lens holder 141 may have a frame shape in which four corners are disposed. The housing 145 may have a frame shape having a central opening and having four corners disposed thereon. The central opening of the lens holder 141 and the central opening of the housing 145 may be aligned along the optical axis direction.

For example, the lens holder 141 may be configured to be relatively movable in an optical axis direction (z-axis direction) or the first direction with respect to the carrier 143. In addition, the carrier 143 may be configured to be relatively movable in the second direction with respect to the housing 145.

A lens driving apparatus 13 is an apparatus that moves the lens barrel 11, and includes an auto focus (AF) driving unit 130 that adjusts focus, and an optical image stabilization (OIS) driving unit 140 that compensates for hand shaking or shaking.

For example, the lens driving apparatus 13 may adjust the focus by moving the lens barrel 11 in the optical axis direction (z-axis direction in the drawing) using an AF driving unit 130, and may correct shaking during photographing by moving the lens barrel 11 in a direction vertical to the optical axis direction (x-axis or y-axis direction in the drawing) using the OIS driving unit 140.

The AF driving unit 130 may include a lens holder 141, and an AF driver 131 generating a driving force to move the lens holder 141 in the optical axis direction.

A rolling member 133 may be disposed between the carrier 143 and the lens holder 141 to reduce friction between the carrier 143 and the lens holder 141 when the lens holder 141 is moved. The rolling member 133 may be in a ball shape, and may be disposed on both sides based on the center of one side of the lens holder 141. At this time, a guide groove 1411 may be formed in the lens holder 141 so that the rolling member 133 may be accommodated and guided in the optical axis direction.

The OIS driving unit 140 may include a guide member for guiding the movement of the lens barrel 11, and an OIS driver for generating a driving force for moving the guide member in a direction vertical to the optical axis direction. For example, the OIS driver may include a pair of magnets vertical to an optical axis direction and disposed orthogonal to each other, and a pair of coils disposed to face the pair of magnets. The pair of magnets and the pair of coils may be positioned in a carrier and a housing, or a housing and a carrier, respectively. As another example, the OIS driver may include a piezoelectric actuator disposed vertically to the optical axis direction and orthogonal to each other. The OIS driver may be disposed in various forms, but a detailed illustration is omitted.

The guide member includes a support frame 144 and the carrier 143. The support frame 144 and the carrier 143 may be inserted into the housing 145 and disposed in an optical axis direction. The support frame 144 and the carrier 143 serve to guide the movement of the lens barrel 11 accommodated in the lens holder 141.

The support frame 144 and the carrier 143 may have a space into which the lens holder 141 may be inserted. The carrier 143 may have a substantially rectangular frame shape, and the support frame 144 may also have a corresponding rectangular frame shape.

Meanwhile, the lens driving apparatus 13 of the embodiment may include a plurality of ball members supporting the OIS driving unit 140. The plurality of ball members may function to guide the carrier 143 and the support frame 144 during the shake correction process. In addition, the plurality of ball members may function to maintain a distance between the carrier 143, the support frame 144, and the housing 145.

The plurality of ball members includes a first ball member 162 and a second ball member 164. The first ball member 162 guides the movement of the OIS driving unit 140 in the first direction, and the second ball member 164 guides the movement of the OIS driving unit 140 in the second direction. The first ball member 162 includes a plurality of ball members disposed between the carrier 143 and the support frame 144, and the second ball member 164 includes a plurality of ball members disposed between the support frame 144 and the housing 145.

A first guide groove portion 1442 accommodating the first ball member 162 therein may be formed in surfaces of the carrier 143 and the support frame 144 facing each other in the optical axis direction, respectively.

The first guide groove portion 1442 may include a plurality of guide grooves. The first ball member 162 may be accommodated in the first guide groove portion 1442 to be inserted between the carrier 143 and the support frame 144. Due to the first ball member 162 being accommodated in the first guide groove portion 1442, the movement of the first ball member 162 is restricted in the optical axis direction and the second direction. Thus, the first ball member 162 is movable only in the first direction.

A second guide groove portion 1452 accommodating the second ball member 164 therein may be formed in surfaces of the support frame 144 and the housing 145 facing each other in the optical axis direction, respectively. The second guide groove portion 1452 may include a plurality of guide grooves. The second ball member 164 may be accommodated in the second guide groove portion 1452 to be inserted between the support frame 144 and the housing 145. Due to the second ball member 164 being accommodated in the second guide groove portion 1452, the movement of the second ball member 164 is restricted in the optical axis direction and the first direction. Thus, the second ball member 164 is movable only in the second direction.

The image sensor unit 17 converts light incident through the lens barrel 11 into an electrical signal. For example, the image sensor unit 17 may include an image sensor 171 and a printed circuit board 173 connected thereto, and may further include an infrared filter. The infrared filter serves to block light in an infrared region in the light incident through the lens barrel 11.

The lens barrel 11 and the lens driving apparatus 13 may be accommodated in the inner space of the housing 145. For example, the housing 145 may have a box shape with an open top and bottom. The image sensor unit 17 may be disposed below the housing 145.

The cover 15 is coupled to the housing 145 to surround an outer surface of the housing 145, and serves to protect the internal components of the camera module 10. Further, the cover 15 may serve to shield electromagnetic waves. For example, the cover 15 may shield electromagnetic waves so that electromagnetic waves generated in the camera module do not affect other electronic components in the portable electronic device.

The camera module 10 according to the embodiment may include a first circuit board 19. The first circuit board 19 may be connected to the sensor unit to apply power to the sensor unit. The sensor may detect the position of the lens barrel 11 in the optical axis direction, the first direction, and the second direction. For example, the first circuit board 19 may have a doubly curved shape.

Figure 3:
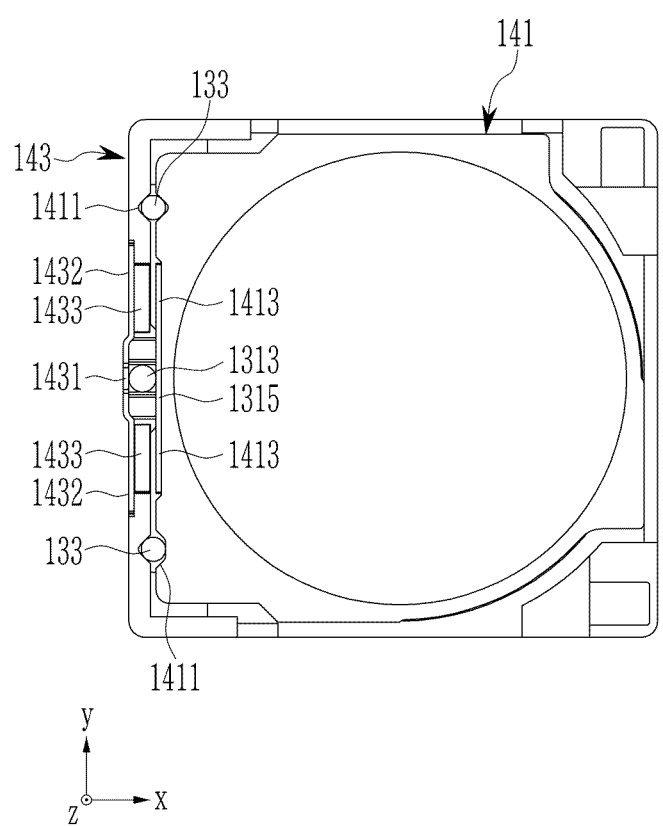
FIG. 3 is a top plan view illustrating an AF driving unit of the camera module shown in FIG. 2.
Figure 4:
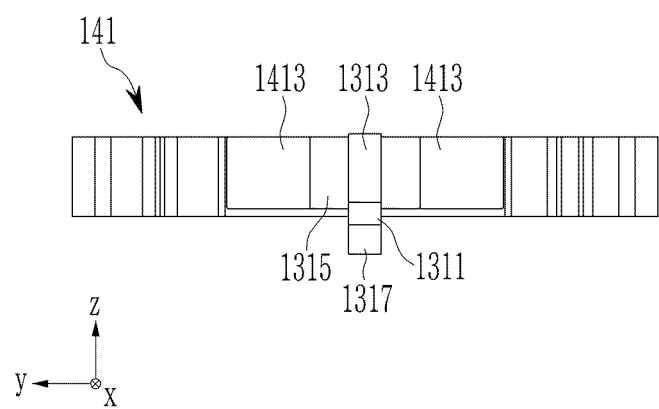
FIG. 4 is a side view illustrating a lens holder and an AF driver among the AF driving unit shown in FIG. 3.
Figure 5:
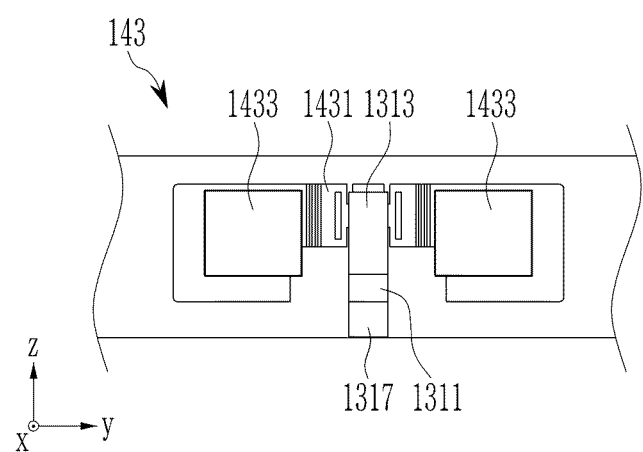
FIG. 5 is a side view illustrating a carrier and the AF driver among the AF driving unit shown in FIG. 3.

FIG. 3 is a top plan view illustrating an AF driving unit of the camera module shown in FIG. 2, FIG. 4 is a side view illustrating a lens holder and an AF driver among the AF driving unit shown in FIG. 3, and FIG. 5 is a side view illustrating a carrier and the AF driver among the AF driving unit shown in FIG. 3.

Referring to FIGS. 3 to 5, the AF driving unit 130 according to the present embodiment may include the lens holder 141, and the AF driver 131 generating a driving force to move the lens holder 141 in the optical axis direction.

The AF driver 131 may include a piezoelectric actuator 1311, a driving rod 1313 connected to the piezoelectric actuator 1311, and a friction member 1315 contacting the driving rod 1313.

The piezoelectric actuator 1311 may be disposed in the carrier 143. For example, the piezoelectric actuator 1311 may be coupled to a supporting portion 1317 and disposed in the carrier 143 via the supporting portion 1317. The supporting portion 1317 may include a metal material such as SUS, copper (Cu), or tungsten (W), or a composite polymer material, but is not limited thereto. The supporting portion 1317 may support the weight of the piezoelectric actuator 1311, and couple the piezoelectric actuator 1311 to the carrier 143. Further, the supporting portion 1317 may adjust a resonant frequency applied to the piezoelectric actuator 1311. The piezoelectric actuator 1311 may vibrate while repeating expansion and contraction rapidly or slowly according to the applied high-frequency pulse voltage. The piezoelectric actuator 1311 may have a shape extending in the optical axis direction. The piezoelectric actuator 1311 may generate vibration that contracts or expands along the optical axis direction by causing mechanical deformation due to an applied voltage.

One end of the driving rod 1313 may be connected to the piezoelectric actuator 1311. The driving rod 1313 may vibrate up and down along the optical axis direction as the piezoelectric actuator 1311 expands and contracts.

The friction member 1315 may be disposed in the lens holder 141. The friction member 1315 may contact the driving rod 1313 and transfer the vibration of the driving rod 1313 to the lens holder 141.

For example, when the piezoelectric actuator 1311 expands rapidly and contracts slowly, the lens holder 141 may move in a direction in which the piezoelectric actuator 1311 contracts. The detailed description is as follows. When the piezoelectric actuator 1311 expands rapidly and contracts slowly, the driving rod 1313 moves quickly along the direction in which the piezoelectric actuator 1311 extends, and moves slowly along the direction in which the piezoelectric actuator 1311 contracts. When the driving rod 1313 moves quickly, the static inertia is greater than the frictional force between the friction member 1315 and the driving rod 1313, so the friction member 1315 does not move and therefore the lens holder 141 does not move either. When the driving rod 1313 moves slowly, the frictional force between the friction member 1315 and the driving rod 1313 is greater than the static inertia, so the friction member 1315 moves along the driving rod 1313. Accordingly, the lens holder 141 also moves in a direction in which the driving rod 1313 moves slowly, that is, in a direction in which the piezoelectric actuator 1311 contracts slowly. When the piezoelectric actuator 1311 rapidly contracts and slowly expands, the lens holder 141 may move in the direction in which the piezoelectric actuator 1311 extends.

An elasticity member 1431 may be disposed in the carrier 143. The elasticity member 1431 may contact the driving rod 1313. The elasticity member 1431 may apply force to the driving rod 1313 in the direction of the lens holder 141. Accordingly, contact between the driving rod 1313 and the friction member 1315 may be maintained. A plate spring is shown as the elasticity member 1431 in FIGS. 3 and 5, but is not limited thereto, and various elasticity members including coil springs may be used.

A magnet 1433 may be disposed in the carrier 143. For example, a yoke 1432 extending from the elasticity member 1431 along a second direction vertical to the optical axis may be disposed in the carrier 143, and the magnet 1433 may be disposed on the yoke 1432. Two or more magnets 1433 may be included and disposed with the driving rod 1313 interposed therebetween.

A magnetic yoke 1413 may be disposed in the lens holder 141. The magnetic yoke 1413 may be disposed to face the magnet 1433 in a first direction vertical to the optical axis. For example, the magnetic yoke 1413 may be formed to extend along the second direction from the friction member

1315. The magnetic yoke 1413 and the friction member 1315 may be manufactured as separate components and connected to each other, or may be integrally provided. The magnet 1433 and the magnetic yoke 1413 form magnetic force to generate an attractive force between the lens holder 141 and the carrier 143, and the weight of the lens accommodated in the lens holder 141 may be supported due to this attractive force.

Figure 6:
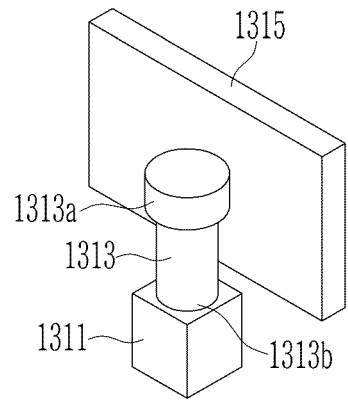
FIG. 6 illustrates a variation of the driving rod shown in FIG. 2.

FIG. 6 illustrates a variation of the driving rod shown in FIG. 2.

Referring to FIG. 6, the driving rod 1313 may include a protruding portion 1313a. The driving rod 1313 may have a fixed end coupled to the piezoelectric actuator 1311, and a free end, which is the other end, and the protruding portion 1313a may be provided on the free end. The protruding portion 1313a may protrude further toward the friction member 1315 than other portions of the driving rod 1313. Accordingly, the friction member 1315 may contact the protruding portion 1313a. For example, the driving rod 1313 and the protruding portion 1313a may have a cylinder shape, and the cross-section of the protruding portion 1313a may be larger than the cross-section of other portions of the driving rod 1313.

Hereinafter, a camera module according to another embodiment will be described with reference to FIGS. 7 and 8.

Figure 7:
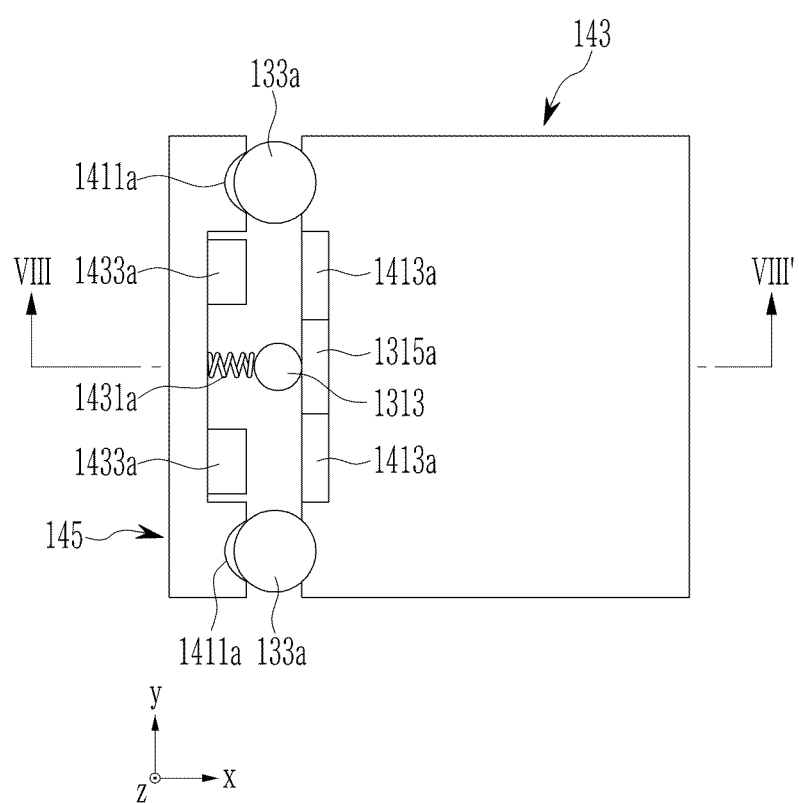
FIG. 7 is a top plan view schematically illustrating an AF driving unit and a carrier of a camera module according to another embodiment.
Figure 8:
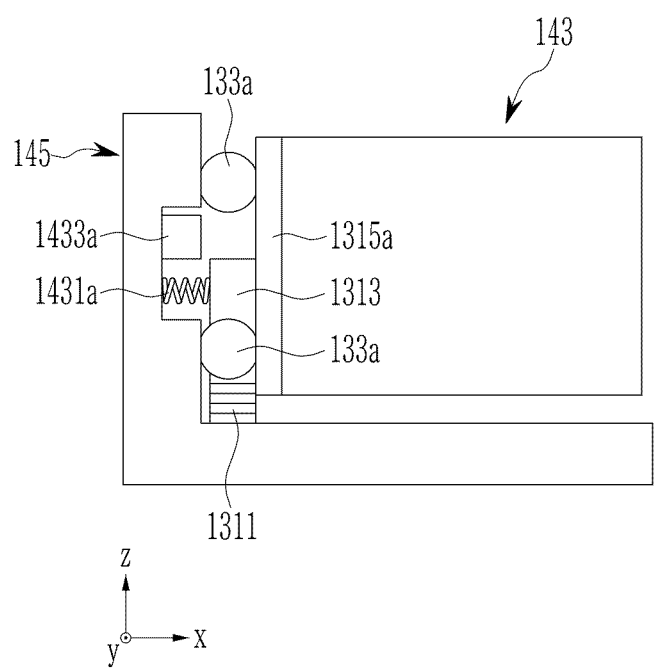
FIG. 8 is a side view of the AF driving unit and the carrier shown in FIG. 7.

FIG. 7 is a top plan view schematically illustrating an AF driving unit and a carrier of a camera module according to another embodiment, and FIG. 8 is a side view of the AF driving unit and the carrier shown in FIG. 7. The camera module according to the embodiment is similar to the embodiment described with reference to FIGS. 1 to 6. A detailed description of the same component is omitted.

Referring to FIGS. 7 and 8, the piezoelectric actuator 1311 of the camera module according to the embodiment may be disposed in the housing 145. For example, the piezoelectric actuator 1311 may be coupled to the supporting portion and disposed on the housing 145 via the supporting portion.

A friction member 1315a may be disposed in the carrier 143. The friction member 1315a may contact the driving rod 1313 and transfer the vibration of the driving rod 1313 to the carrier 143.

An elasticity member 1431a may be disposed on the housing 145. The elasticity member 1431a may contact the driving rod 1313. The elasticity member 1431a may apply force to the driving rod 1313 in the direction of the carrier 143. Accordingly, contact between the driving rod 1313 and the friction member 1315a may be maintained. The plate spring is shown as the elasticity member 1431 in FIGS. 3 and 5, but is not limited thereto, and various elasticity members including coil springs may be used.

A coil spring is shown as the elasticity member 1431a in FIGS. 7 and 8, but it is not limited thereto, and various elasticity members including a plate spring may be used.

A magnet 1433a may be disposed in the housing 145. Two or more magnets 1433a may be included and disposed with the driving rod 1313 interposed therebetween.

A magnetic yoke 1413a may be disposed in the carrier 143. The magnetic yoke 1413a may be disposed to face the magnet 1433a. For example, the magnetic yoke 1413a may be formed to extend from the friction member 1315a.

A rolling member 133a may be disposed between the carrier 143 and the housing 145, and a guide groove 1411a may be formed in the housing 145 so that the rolling member 133a may be accommodated and guided in the optical axis direction.

Hereinafter, a camera module according to another embodiment will be described with reference to FIG. 9.

Figure 9:
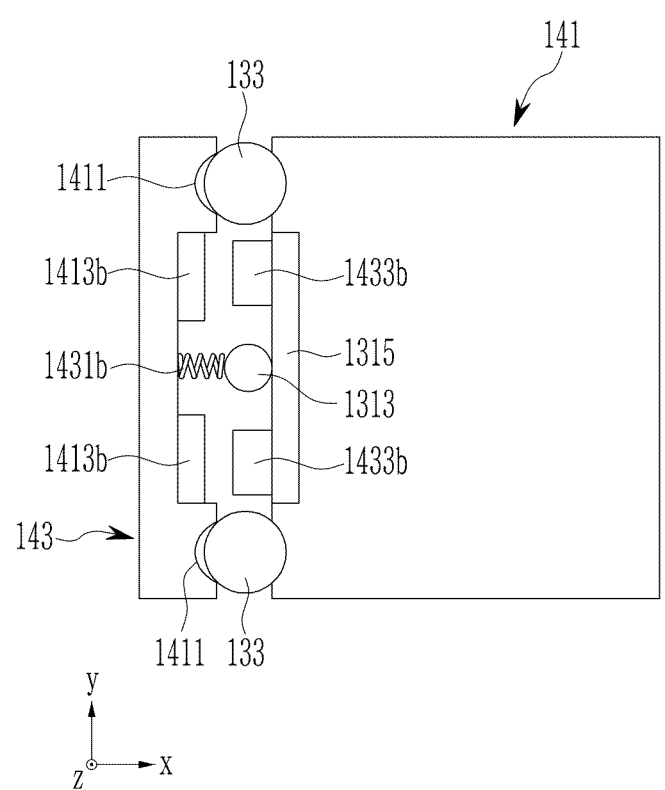
FIG. 9 is a top plan view illustrating an AF driving unit and a carrier of a camera module according to another embodiment.

FIG. 9 is a top plan view schematically illustrating an AF driving unit and a carrier of a camera module according to another embodiment. The camera module according to the embodiment is similar to the embodiment described with reference to FIGS. 1 to 8. A detailed description of the same component is omitted.

Referring to FIG. 9, in the camera module according to the present embodiment, a magnet 1433b may be disposed on the lens holder 141. The magnet 1433b may be positioned on the friction member 1315 disposed in the lens holder 141. Two or more magnets 1433b may be included and disposed with the driving rod 1313 interposed therebetween.

The magnetic yoke 1413b may be disposed on the carrier 143 to face the magnet 1433b disposed on the lens holder 141.

The piezoelectric actuator 1311 is disposed on the carrier 143, and one end of the driving rod 1313 may be connected to the piezoelectric actuator 1311.

The friction member 1315 may be disposed on the lens holder 141 and contact the driving rod 1313. The friction member 1315 may have a wide panel shape so that two or more magnets 1433b may be spaced apart from each other with the driving rod 1313 interposed therebetween.

The elasticity member 1431b is disposed on the carrier, and may contact the driving rod 1313. The elasticity member 1431b may apply force to the driving rod 1313 in the direction of the lens holder 141.

Although not shown, as shown in FIGS. 7 and 8, even when the piezoelectric actuator is disposed in the housing, constituent elements may be disposed in a structure similar to that shown in FIG. 9. That is, the magnet may be disposed on the carrier, the magnetic yoke may be disposed on the housing so as to face the magnet disposed on the carrier, and the friction member may be disposed on the carrier and contact the driving rod.

Hereinafter, a camera module according to another embodiment will be described with reference to FIG. 10.

Figure 10:
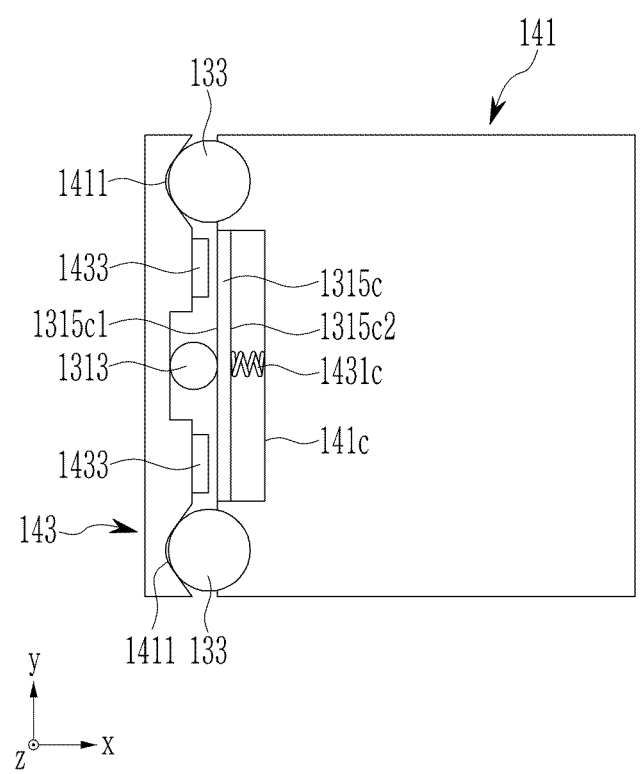
FIG. 10 is a top plan view illustrating an AF driving unit and a carrier of a camera module according to another embodiment.

FIG. 10 is a top plan view illustrating an AF driving unit and a carrier of a camera module according to another embodiment. The camera module according to the embodiment is similar to the embodiment described with reference to FIGS. 1 to 9. A detailed description of the same component is omitted.

Referring to FIG. 10, a friction member 1315c of the camera module according to the embodiment is fixed to the lens holder 141, and may have a first surface 1315c1 and a second surface 13151c2 facing each other. The first surface 1315c1 of the friction member 1315c may contact the driving rod 1313. The second surface 1315c2 of the friction member 1315c is spaced apart from an outer surface 141c of the lens holder 141, and may face the outer surface 141c of the lens holder 141.

An elasticity member 1431c may be positioned between the second surface 1315c2 of the friction member 1315c and the outer surface 141c of the lens holder 141. The elasticity member 1431c may be fixed to the outer surface 141c of the lens holder 141. The elasticity member 1431c may contact the second surface 1315c2 of the friction member 1315c and apply force to the second surface 1315c2 of the friction member 1315c in the direction of the carrier 143. Accordingly, contact between the driving rod 1313 and the friction member 1315c may be maintained.

Hereinafter, a camera module according to another embodiment will be described with reference to FIG. 11.

Figure 11:
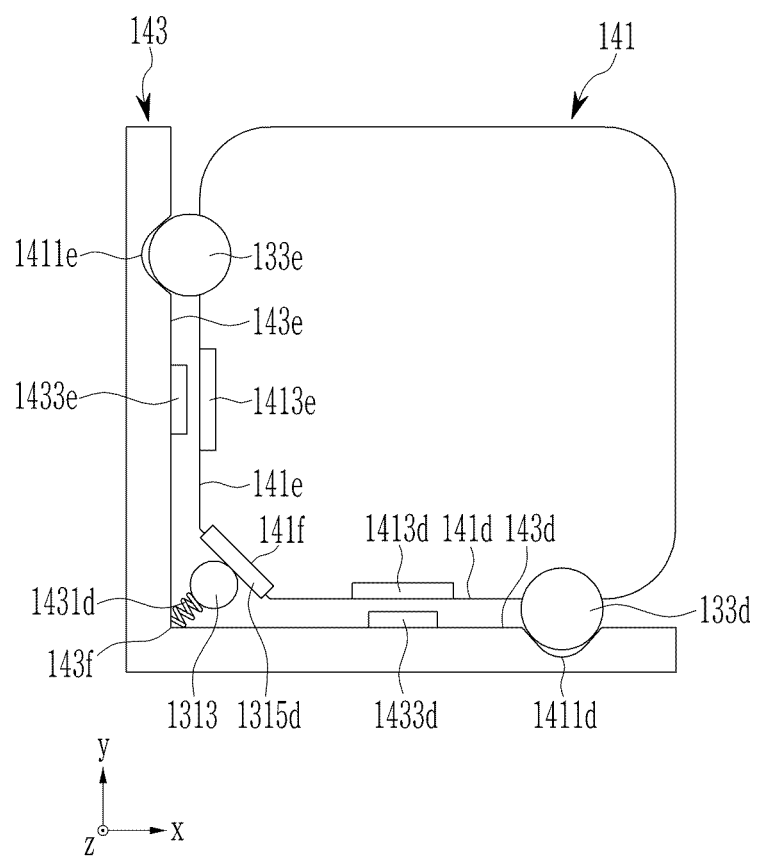
FIG. 11 is a top plan view illustrating an AF driving unit and a carrier of a camera module according to another embodiment.

FIG. 11 is a top plan view schematically illustrating an AF driving unit and a carrier of a camera module according to another embodiment. The camera module according to the embodiment is similar to the embodiment described with reference to FIGS. 1 to 10. A detailed description of the same component is omitted.

Referring to FIG. 11, two or more magnets 1433d and 1433e of the camera module according to the embodiment may be included, and may be disposed vertically to each other on a plane vertical to an optical axis. The carrier 143 may have a first inner surface 143d parallel to the first direction and a second inner surface 143e parallel to the second direction. The magnets 1433d and 1433e may be respectively disposed on the first inner surface 143d and the second inner surface 143e of the carrier 143.

The lens holder 141 may have a first outer surface 141d and a second outer surface 141e respectively facing the first inner surface 143d and the second inner surface 143e of the carrier 143. Magnetic yokes 1413d and 1413e facing the magnets 1433d and 1433e may be disposed on the first outer surface 141d and the second outer surface 141e of the lens holder 141, respectively.

A friction member 1315d may be disposed between the magnetic yokes 1413d and 1413e. For example, the friction member 1315d may be disposed at a corner 141f positioned between the first outer surface 141d and the second outer surface 141e of the lens holder 141.

The elasticity member 1431d may be disposed between the magnets 1433d and 1433e. For example, the elasticity member 1431d may be disposed at a corner 1431d positioned between the first inner surface 143d and the second inner surface 143e of the carrier 143.

Rolling members 133d and 133e may be positioned on the first and second inner surfaces 143d and 143e of the carrier 143 and the first and second outer surfaces 141d and 141e of the lens holder 141, respectively. Guide grooves 1411d and 1411e accommodating the rolling members 133d and 133e may be formed on the first inner surface 143d and the second inner surface 143e of the carrier 143, respectively.

Hereinafter, a camera module according to another embodiment will be described with reference to FIGS. 12 to 15.

Figure 12:
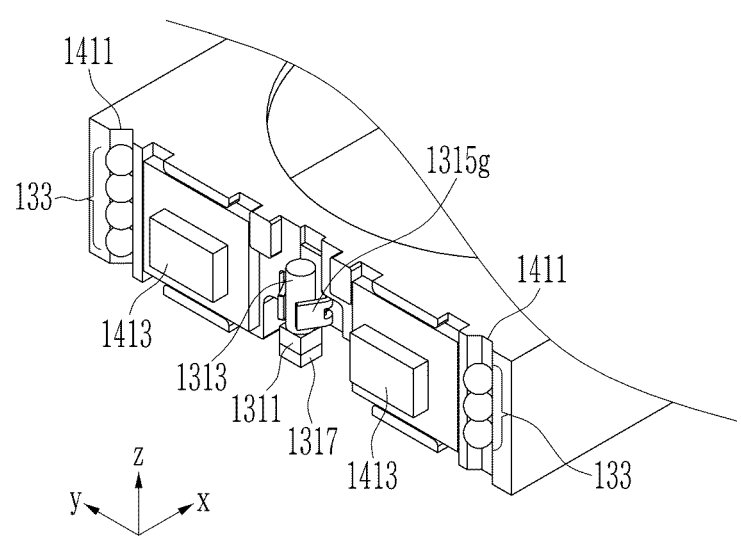
FIG. 12 is a top plan view illustrating an AF driving unit of a camera module according to another embodiment.
Figure 13:
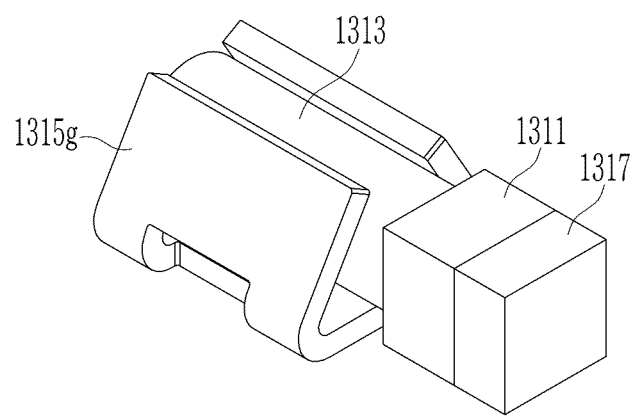
FIG. 13 illustrates a variation of a friction member.
Figure 14:
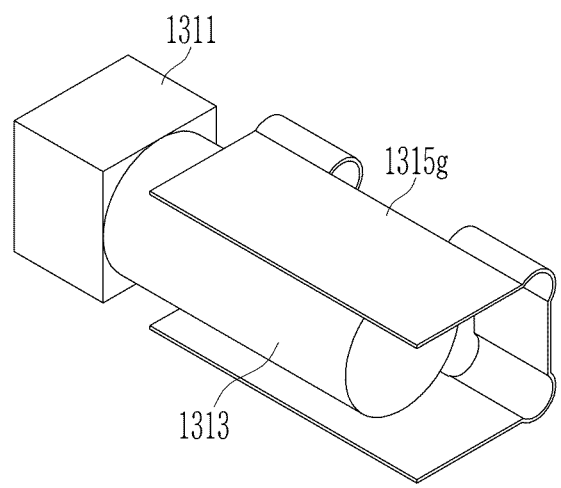
FIG. 14 illustrates another variation of the friction member.
Figure 15:
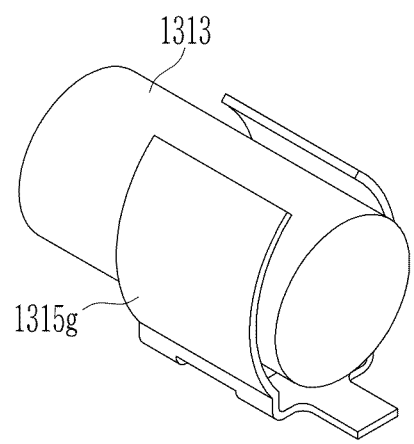
FIG. 15 illustrates another variation of the friction member.

FIG. 12 is a top plan view schematically illustrating an AF driving unit of a camera module according to another embodiment, and FIGS. 13 to 15 illustrate variations of the friction member. The camera module according to the embodiment is similar to the embodiment described with reference to FIGS. 1 to 11. A detailed description of the same component is omitted.

Referring to FIGS. 12 to 15, a friction member 1315g may have two or more parts contacting the driving rod 1313. The friction member 1315g may have a shape surrounding at least a portion of the driving rod 1313. The friction member 1315g may contact the driving rod 1313 at three locations (see FIG. 13). The friction member 1315g may contact the driving rod 1313 in three different directions. For example, three locations where the friction member 1315g contacts the driving rod 1313 may form an angle of approximately 60 degrees when a straight line is drawn from the center of the driving rod 1313 to the contact location. As another example, the friction member 1315g may contact the driving rod 1313 at two locations (see FIG. 14). The friction member 1315g may contact the driving rod 1313 at two locations in different directions. For example, the friction member 1315g may contact the driving rod 1313 at locations facing each other in the second direction. As another example, the friction member 1315g may contact the driving rod 1313 at two or more wide locations (see FIG. 15). For example, at least a portion of the friction member 1315g may have the same or similar curvature as the driving rod 1313, and may contact the driving rod 1313 in a form of surrounding the driving rod 1313. However, the friction member 1315g is not limited to the examples shown in FIGS. 12 to 15, and various shapes of the friction member 1315g may be formed. For example, the friction member 1315g may have an elastic clamp shape.

Hereinafter, a camera module according to another embodiment will be described with reference to FIGS. 16 and 17.

Figure 16:
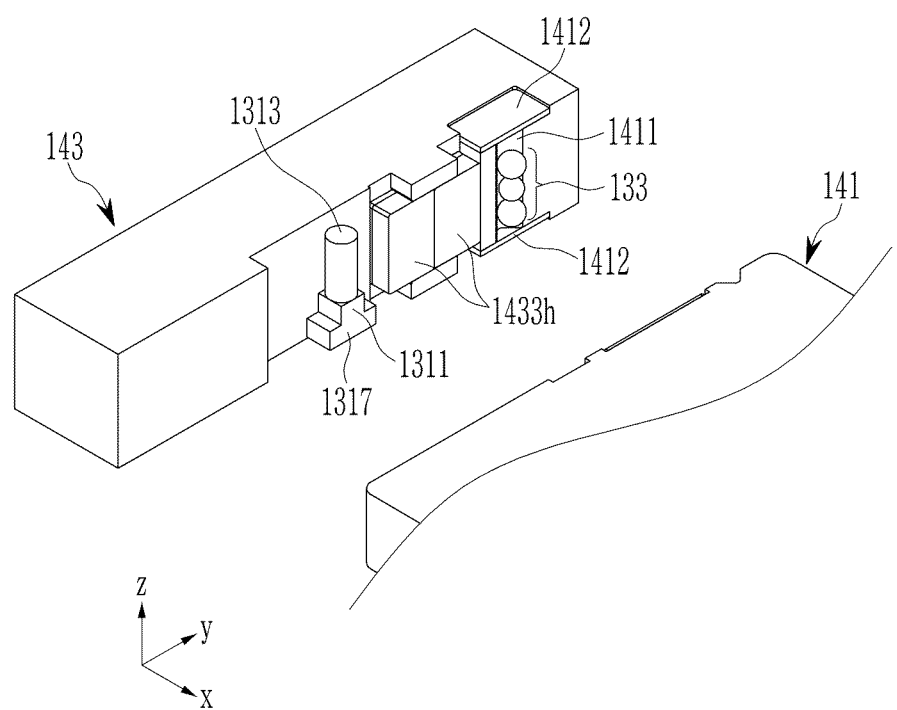
FIG. 16 is a partially exploded perspective view illustrating an AF driving unit and a carrier of a camera module according to another embodiment.
Figure 17:
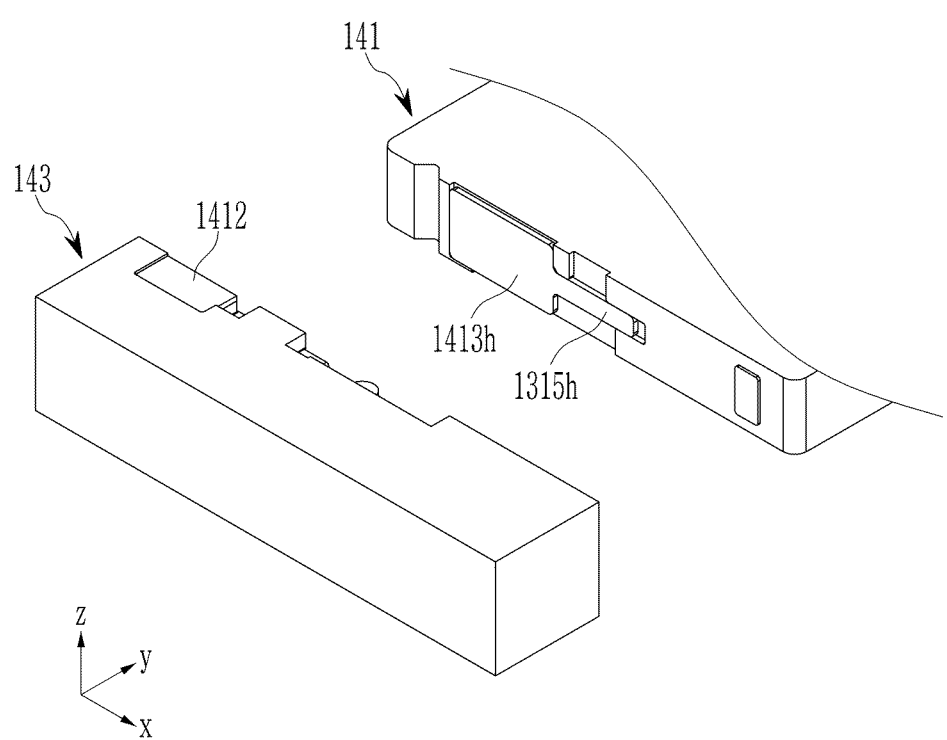
FIG. 17 is a partially exploded perspective view illustrating the AF driving unit and the carrier of the camera module of FIG. 16 from another angle.

FIGS. 16 and 17 are partial exploded perspective views illustrating an AF driving unit and a carrier of a camera module according to another embodiment. The camera module according to the embodiment is similar to the embodiment described with reference to FIGS. 1 to 6. A detailed description of the same component is omitted.

Referring to FIGS. 16 and 17, a magnet 1433h of the camera module according to the embodiment may be disposed on one side of the carrier 143 with respect to the driving rod 1313. A magnetic yoke 1413h may be disposed on one side of the lens holder 141 facing the magnet 1433h. The magnetic yoke 1413h may extend from a friction member 1315h.

The guide groove 1411 accommodating the rolling member 133 may be formed in the carrier 143. A stopper 1433h may be disposed at the top and/or bottom of the guide groove 1411.

According to the lens driving apparatus and the camera module configured as described above, since the weight of the lens may be supported by the facing magnet and the magnetic yoke, high-speed focus adjustment is possible even when the lens is heavy.

In addition, since the driving rod and the friction member may always be in contact with each other by the elasticity member, and constant frictional force is maintained through this. Therefore, there may be little or almost no deviation in focus adjustment performance.

In addition, since it may be manufactured without a separate member such as a bearing between the driving rod or the piezoelectric actuator and the friction member, the number of components and the structure are simple. Therefore, it is possible to produce without complicated consideration of assembly tolerance, thereby increasing productivity.

One or more embodiments may provide a lens driving apparatus capable of high-speed focus adjustment even when the lens is heavy by supporting the weight of the lens, and a camera module including the same. According to one or more embodiments, since the weight of the lens may be supported by a magnet and a magnetic yoke facing each other, high-speed focus adjustment is possible even when the lens is heavy.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. A lens driving apparatus, comprising:
   a lens holder having a central opening in which a lens is accommodated;
   a carrier accommodating the lens holder;
   an auto focus (AF) driver, comprising a piezoelectric actuator disposed in the carrier, a driving rod connected to the piezoelectric actuator, and a friction member disposed in the lens holder and contacting the driving rod;
   a magnet disposed in any one of the lens holder and the carrier;
   a magnetic yoke disposed in another one of the lens holder and the carrier to face the magnet; and
   an elasticity member positioned between the lens holder and the carrier.

2. The lens driving apparatus of claim 1, wherein
   the magnet comprises two or more magnets with the driving rod disposed therebetween or thereamong.

3. The lens driving apparatus of claim 2, wherein
   the carrier has a first inner surface and a second inner surface parallel to an optical axis direction and parallel to each other,
   the two or more magnets are disposed, at least, one on each of the first inner surface and the second inner surface.

4. The lens driving apparatus of claim 1, wherein
   the magnet is disposed in the carrier.

5. The lens driving apparatus of claim 1, wherein
   the elasticity member is disposed in the carrier and contacts the driving rod.

6. The lens driving apparatus of claim 1, wherein
   the magnet is disposed in the lens holder.

7. The lens driving apparatus of claim 6, wherein
   the magnet is disposed on the friction member.

8. The lens driving apparatus of claim 7, wherein
   the magnet comprises two or more magnets with the driving rod disposed therebetween or thereamong.

9. The lens driving apparatus of claim 1, wherein
   the friction member has a first surface in contact with the driving rod and a second surface facing an opposite direction from the first surface, and
   the elasticity member is positioned between an outer surface of the lens holder and the second surface of the friction member.

10. The lens driving apparatus of claim 1, wherein
    the friction member has at least two portions in contact with the driving rod.

11. The lens driving apparatus of claim 1, wherein
    the driving rod includes a protruding portion at a free end, and the protruding portion protrudes more toward the friction member than other portions of the driving rod, and
    the friction member contacts the protruding portion.

12. The lens driving apparatus of claim 1, further comprising:
    a rolling member positioned between the carrier and the lens holder.

13. The lens driving apparatus of claim 12, wherein
    opposing surfaces of the carrier and the lens holder further include guide grooves accommodating the rolling member in a direction parallel to an optical axis direction.

14. The lens driving apparatus of claim 13, wherein
    a stopper is disposed at a top or bottom of the guide groove.

15. The lens driving apparatus of claim 9, wherein
    at least one first rolling member is positioned between the first inner surface of the carrier and the lens holder, and at least one second rolling member is positioned between the second inner surface of the carrier and the lens holder.

16. A camera module, comprising:
    the lens driving apparatus of claim 1.

17. A camera module, comprising:
    a lens barrel including a lens;
    a lens holder having a central opening in which the lens barrel is accommodated;
    a carrier accommodating the lens holder;
    an auto focus (AF) driver, comprising a piezoelectric actuator disposed in the carrier, a driving rod connected to the piezoelectric actuator, and a friction member disposed in the lens holder to contact the driving rod;
    a magnet disposed in any one of the lens holder and the carrier;
    a magnetic yoke disposed in an other one of the lens holder and the carrier to face the magnet; and
    an elasticity member positioned between the lens holder and the carrier.

18. The camera module of claim 17, wherein
    the magnet comprises two or more magnets with the driving rod disposed therebetween or thereamong.

19. The camera module of claim 17, wherein
    the magnet is disposed in the carrier.

20. The camera module of claim 17, wherein
    the magnet is disposed in the lens holder.

21. The camera module of claim 17, wherein
    the elasticity member is disposed on the carrier to contact the driving rod.

* * * * *